Jan. 5, 1937.  G. F. WALES  2,067,133
FLUE BAFFLE FOR HEATING APPARATUS
Filed March 28, 1935   2 Sheets-Sheet 1
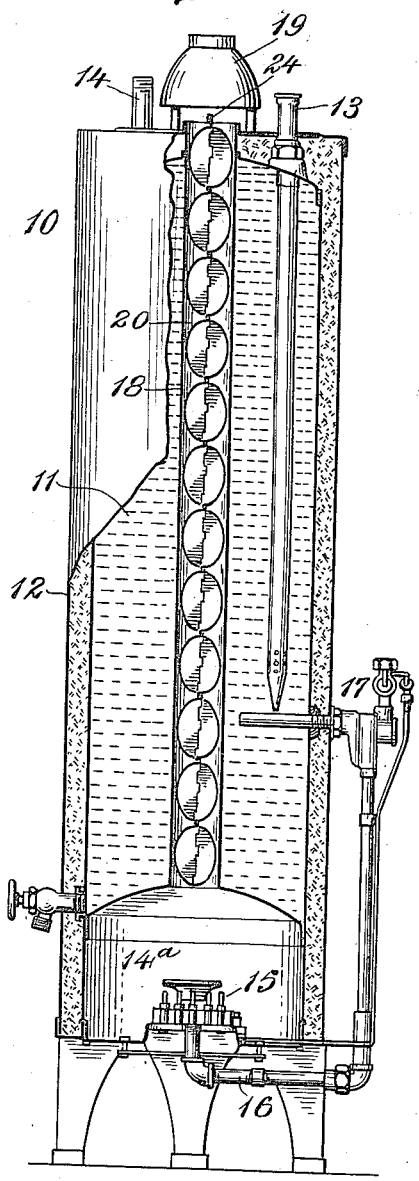
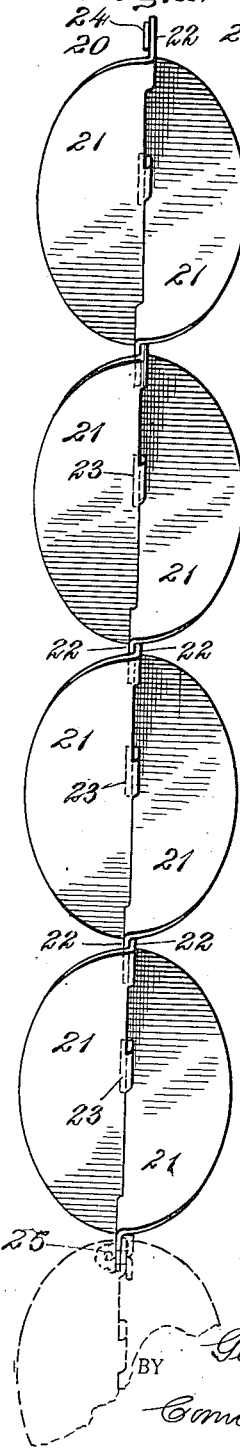
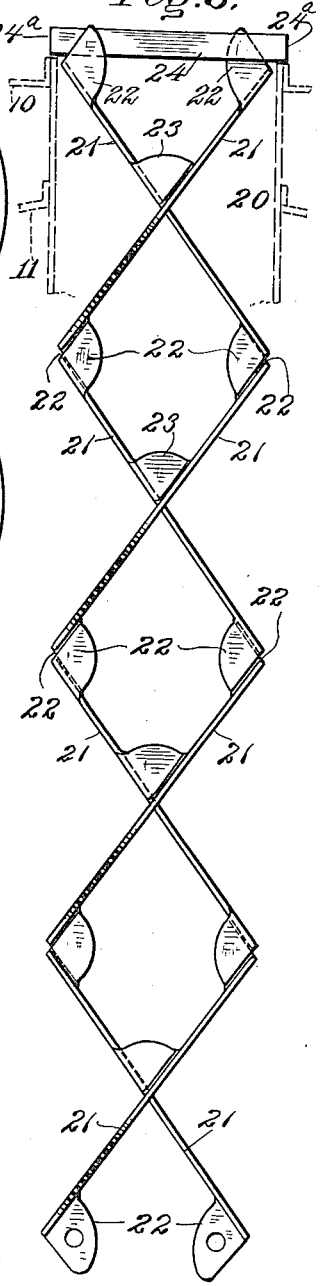
INVENTOR
George F. Wales
BY
Conrad A. Dieterich
his ATTORNEY.

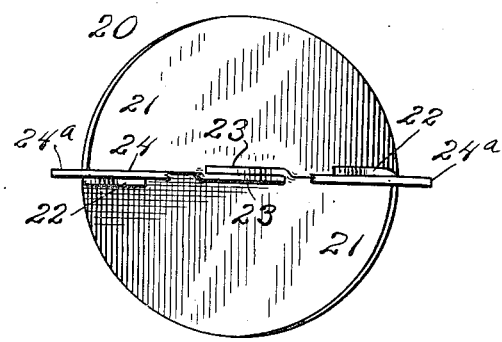
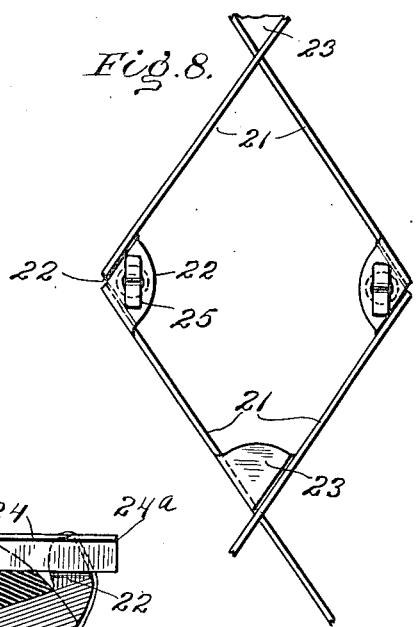
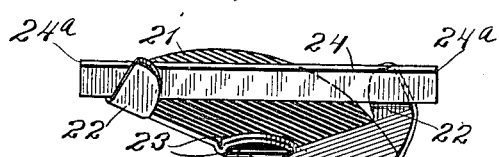
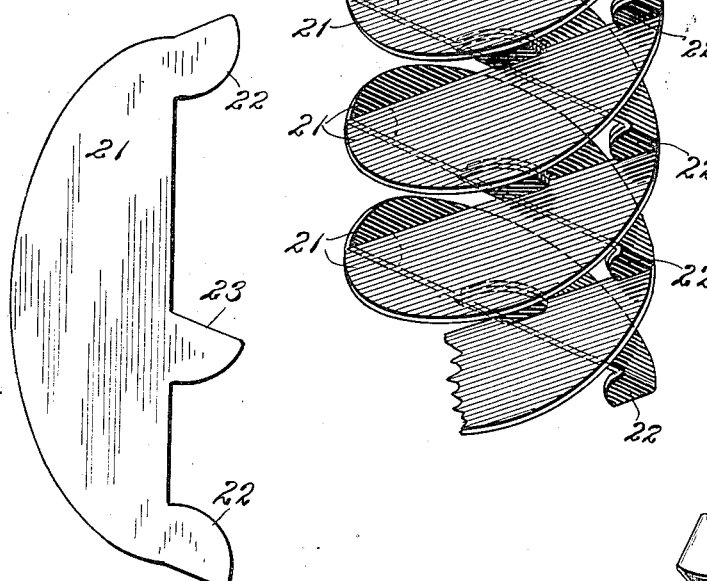
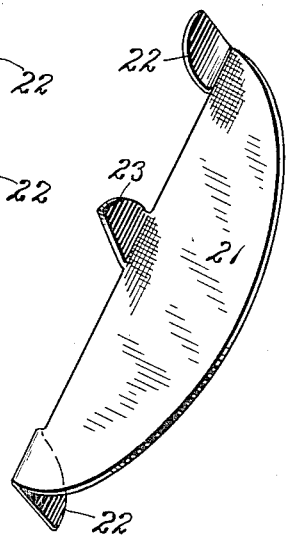

Patented Jan. 5, 1937

2,067,133

UNITED STATES PATENT OFFICE 2,067,133

FLUE BAFFLE FOR HEATING APPARATUS

George F. Wales, Buffalo, N. Y., assignor to American Radiator Company, New York, N. Y., a corporation of New Jersey Application March 28, 1935, Serial No. 13,474

14 Claims. (Cl. 138—38)

My invention relates to improvements in heating apparatus, and more particularly to the type employing tubular flues for the passage of the hot gases and products of combustion from the fuel receptacle to the stack, and said invention has for its object to provide a simple, efficient and inexpensive device for increasing the efficiency of the heating apparatus.

Further, said invention has for its object to provide means which may be readily inserted within the fire tubes of a heating apparatus whereby the gas travel will be lengthened, and the movement of the gases delayed or retarded sufficiently to insure the most effective transfer of heat from the fuel to the fluid to be heated.

Further, said invention has for its object to provide means which may be readily inserted into the fire tubes of a heating apparatus, and which will serve to baffle the passage of the hot gases therethrough, and at the same time impart a spiral motion to said gases.

Further, said invention has for its object to provide a readily removable baffle to be inserted into and removed from the fire tubes of a heating apparatus to permit of cleaning or repairing.

Further, said invention has for its object to provide a baffle formed of a plurality of similarly-shaped elements stamped out of sheet metal and secured together at their abutting ends and edges whereby to form a structure which, when inserted into a fire tube, will form two continuous interwoven spiral passages for the hot gases and products of combustion.

Further, said invention has for its object to provide a baffle of sheet metal elements which may be conveniently secured together to form a structure of any desired length.

Other objects will in part be obvious, and in part be pointed out hereinafter.

To the attainment of the aforesaid objects and ends my invention consists in the novel features of construction, and in the combination, connection and arrangement of parts hereinafter more fully described and then pointed out in the claims.

In the accompanying drawings—

Figure 1 is a central vertical section of a water heater having a central flue therein provided with one form of baffle constructed according to, and embodying our said invention;

Fig. 2 is a side elevation, on an enlarged scale, showing a portion of a baffle formed of a plurality of segmental plates or elements;

Fig. 3 is an edge view thereof looking in the direction of the arrow $a$, Fig. 2;

Fig. 4 is an end view of the baffle as seen in edge view at Fig. 3;

Fig. 5 is a perspective view of a portion of a baffle;

Fig. 6 is a detail face view of a blank from which a single plate or element is formed;

Fig. 7 is a perspective view of the plate shown at Fig. 6 in condition to be united to other similar plates or elements, and Fig. 8 is a detail edge view showing one way of detachably securing several separate sections or lengths together.

In said drawings 10 designates a hot water heating apparatus of well known general form comprising a tank 11 enclosed within a suitable jacket 12. 13 denotes the cold water inlet pipe extending from a source of cold water supply, and 14 the hot water outlet pipe adapted for connection to the distributing system. Within the jacket 12, and below the tank 11, is a combustion chamber 14ᵃ within which is located a gas burner 15 having a supply pipe 16 connected thereto provided with a thermostatically controlled valve 17. The tank 11 is provided with a central fire tube 18 which extends from the combustion chamber 14ᵃ, and terminates above the top of the jacket 12 where the same is provided with a deflecting hood 19.

20 denotes a baffle disposed within the fire tube 18, and is shown as suspended within said fire tube by a transverse bar 24 secured to the upper end of said baffle and carried upon the upper end of said fire tube.

The baffle 20 is composed of a plurality of similarly-formed, semi-elliptical plates 21, each having a straight base or inner edge 21ᵃ and a curved upper or outer edge 21ᵇ, and each plate having substantially quadrant-shaped attaching members or ears 22 at its ends, and a similarly-shaped ear 23 at the middle of its lower edge.

The plates 21 are arranged in two tiers or series with their straight edges meeting midway between their ends, and secured together by welding or otherwise fastening the registering ears 22, 23 together. The plates 21 are of such form and size that when the plates of the one series are disposed at an angle of about 70° to the plates of the other series the elliptical edges of each pair of cooperating plates will, when viewed endwise as illustrated at Fig. 4, jointly describe a circle possessing a diameter slightly less than the diameter of the fire tube within which the baffle is to be disposed.

The two tiers or series of plates, when secured together as hereinabove described and illustrated in the drawings, form a double zig-zag structure, one zig-zag being in effect interwoven with the other throughout the entire length of the structure.

In order to removably support the baffle 20 within the fire tube 18, the same is provided at one end with a transverse bar 24 which is welded or otherwise secured to the ears 22 of the end plates 21. The bar is somewhat greater in length than the internal diameter of the tube so that the projecting ends 24$^a$ thereof may rest upon the upper edge of said fire tube and so maintain the baffle suspended within the tube.

When the heating apparatus is of a vertical form and installed in a cellar or room having a low ceiling it would not be possible to withdraw the baffle as a single piece from the fire tube. To provide for such conditions the baffle is made in several lengths and the ears 22 of the abutting ends of the lengths perforated to receive cotter pins or rivets 25 which may be easily removed so as to permit of the ready separation of the several lengths, and the removal of the baffle in sections.

It will, of course, be obvious that the length of travel provided by the interwoven members of the baffle may be increased or diminished by changing the relative angle of the plates of the upper and lower series thereof and that the baffle may be supported or secured within a flue in any suitable or convenient manner.

Having thus described my said invention what I claim and desire to secure by Letters Patent is:

1. A baffle structure for flues comprising a plurality of series of plates, the plates of each series being arranged in parallelism, and the plates of one series arranged at an angle to the plates of the other of said series, and the plates of one series secured at their edges to the corresponding edges of adjacent cooperating plates of the other of said series.

2. A baffle structure for flues comprising a plurality of series of plates, the plates of each series being arranged in parallelism and the plates of one series arranged at an angle to the plates of the other of said series, and attaching means at the adjacent edges of said plates for securing the same together longitudinally in pairs.

3. A baffle structure for flues comprising a plurality of series of connected plates, each of said plates having a straight base edge and a curved outer edge, and the plates of each series being arranged diagonally to the longitudinal axis of the structure with the plates of one series extending in a reverse direction to the plates of the other of said series; the plates of each series being secured at their base edges to the corresponding edges of adjacent plates.

4. A baffle structure for flues comprising a plurality of series of plates, each of said plates having a straight base edge and a curved outer edge, and the plates of each series being arranged diagonally to the longitudinal axis of the structure with the plates of one series extending in a reverse direction to the plates of the other of said series, and attaching members along the adjacent edges of the plates of each series for securing said plates together in pairs.

5. A baffle structure for flues comprising a plurality of series of substantially semi-elliptical plates arranged cross-wise in pairs with each plate diagonally disposed to the longitudinal axis of the structure, and attaching members along the corresponding edges of the adjacent plates of each series for securing said pairs of plates together and to the other of said plates.

6. A baffle structure for flues comprising a plurality of series of substantially semi-elliptical plates arranged cross-wise in pairs with each plate diagonally disposed to the longitudinal axis of the structure, and attaching members integral with said plates extending in opposite directions from the straight edges of said plates, the attaching members of one pair of plates registering with the attaching members of adjacent plates for securing said plates together in pairs and in end to end relation.

7. A baffle structure for flues comprising a plurality of series of substantially semi-elliptical plates, the corresponding plates of each series being arranged in pairs and the plates of each series arranged in parallelism and diagonally to the longitudinal axis of the structure, and attaching members formed integrally with said plates, the plates of one series arranged in crosswise relation to the cooperating plates of the other of said series.

8. A baffle structure for flues comprising a plurality of series of substantially semi-elliptical plates the corresponding plates of each series being arranged in pairs with each plate diagonally disposed to the longitudinal axis of the structure, and attaching members formed integrally with said plates, and extending laterally from the corners of said plates and from an intermediate point in the length of said plates and registering with the attaching members of the adjacent plates for securing said plates together.

9. A baffle structure for flues comprising a plurality of series of substantially semi-elliptical plates, the corresponding plates of each series being arranged in pairs with each plate diagonally disposed to the longitudinal axis of the structure, and attaching members formed integrally with said plates extending laterally from the corners of said plates and from an intermediate point in the length of said plates and registering with the attaching members of adjacent plates for securing said plates together, the plates of one series arranged in cross-wise relation to the cooperating plates of the other of said series, and means for supporting said baffle structure within a flue.

10. A baffle structure for flues comprising a plurality of series of semi-elliptical plates arranged cross-wise in pairs and the plates of each series arranged diagonally to the longitudinal axis of the structure, the plates of one series being secured at their edges to the corresponding edges of adjacent plates of the other of said series, and a transverse bar secured inwardly of its ends to the free edges of plates at one end of the structure for supporting the same in suspended position.

11. A baffle structure for flues comprising a plurality of separate lengths each including a plurality of series of plates with the plates of each series arranged in parallelism and the corresponding plates of the series arranged crosswise in pairs, and the plates of each pair secured at their ends to the registering ends of adjacent pairs of plates, and means for detachably securing said separate lengths together in end to end relation.

12. A baffle structure for flues comprising a plurality of series of plates with the plates of each series arranged in parallelism and disposed cross-wise of the corresponding plates of the other series, and means for securing the plates of one series at the ends thereof to the registering ends of the plates of the other of said series.

13. A baffle structure for flues comprising a plurality of series of plates with the plates of each series arranged in parallelism and disposed cross-wise of the corresponding plates of the other series, and means for securing the plates of one series at their edges to the edges of the plates of the other of said series.

14. A baffle structure for flues comprising a plurality of series of plates with the plates of each series arranged in parallelism and disposed cross-wise of the corresponding plates of the other of said series, and the plates of each series being secured at their edges to the edges of the adjacent cooperating plates of the other series, and means for supporting said baffle structure within a flue.

GEORGE F. WALES.